Dec. 20, 1966  F. A. WOOD  3,292,591
ANIMAL CAPTURING AND RESTRAINING DEVICE
Filed April 7, 1965  2 Sheets-Sheet 1
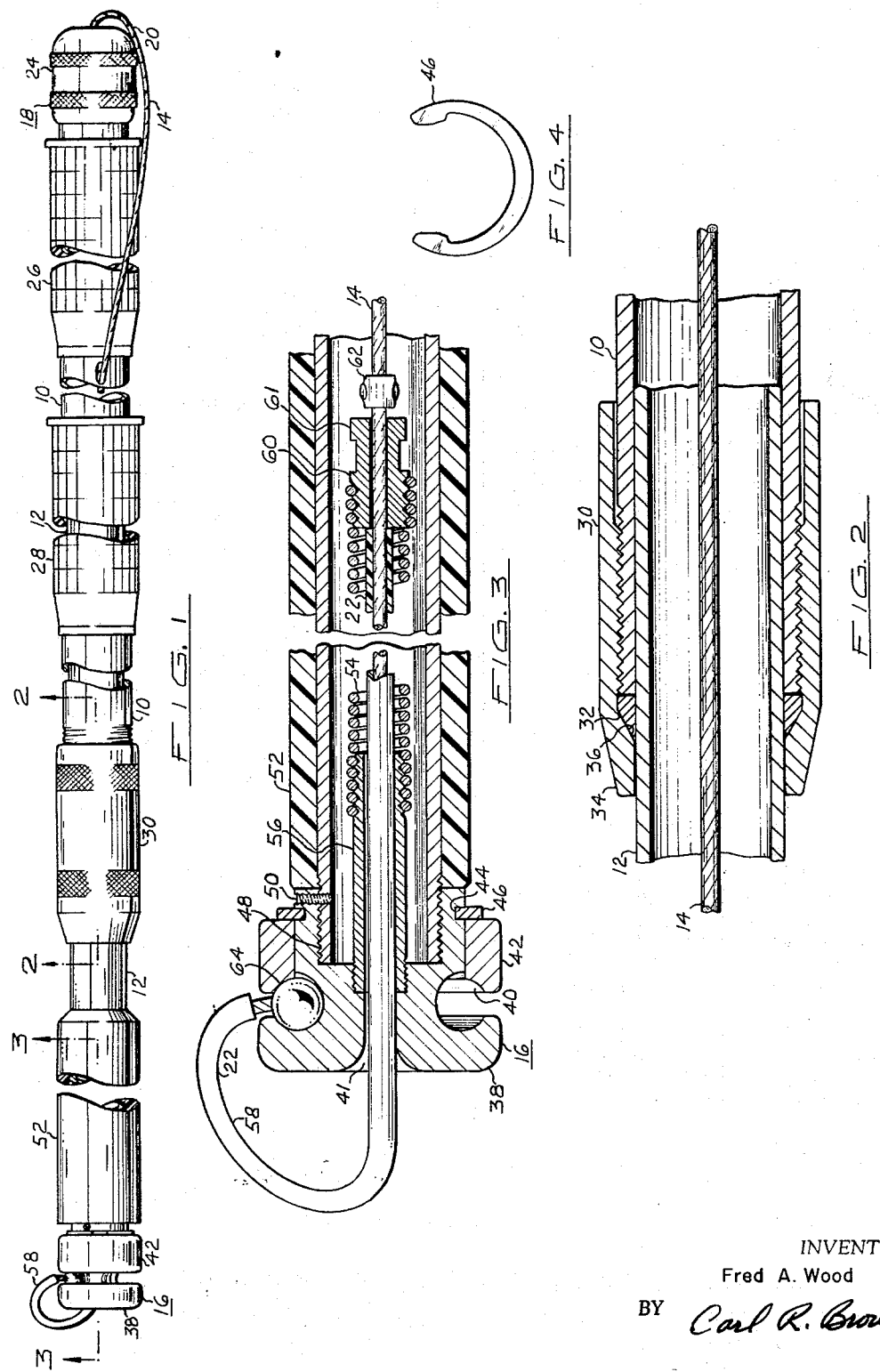
INVENTOR.
Fred A. Wood
BY *Carl R. Brown*
ATTORNEY Dec. 20, 1966   F. A. WOOD   3,292,591
ANIMAL CAPTURING AND RESTRAINING DEVICE
Filed April 7, 1965   2 Sheets-Sheet 2

INVENTOR.
FRED A. WOOD
BY

ATTORNEY

United States Patent Office 3,292,591
Patented Dec. 20, 1966

3,292,591
ANIMAL CAPTURING AND RESTRAINING
DEVICE
Fred A. Wood, 2916 Broadway, San Diego, Calif. 92102
Filed Apr. 7, 1965, Ser. No. 446,287
7 Claims. (Cl. 119—153)

This invention relates to an animal capturing and restraining device and more particularly to an improved animal capturing and restraining device that is capable of selectively ejecting a flexible cable having a length sufficient to form a loop or bite over the snout, neck, legs, or other part of an animal and capture the animal and control it. The improved animal capturing and restraining device of this invention also provides for locking the free end of the cable in cooperation with its ejected movement to enlarge the adjustable loop and for other means to protect the animal captured and restrained.

Animal capturing and restraining devices are widely used by hunters, veterinarians, humane officers, and the like for capturing and restraining wild and vicious animals, snakes, birds, and the like, without causing permanent injury either to the user or the animals. However, these restraining devices, such as that shown in my Patent No. 2,704,052, present problems when used. For example, in such prior devices, the length of the loop or bite of the flexible cable may be selectively reduced in size to grip the animal captured and restrained by manually pulling on the cable. The gripping cable is then locked in position. But when the animal is to be released, the loop cannot be enlarged quickly and easily. Also it has been found that in using prior art devices, the restrained animals or the like in twisting or fighting the restraint twist the flexible cable around the end of the longitudinal handle injuring themselves. Also the animals will bite the end of the handle injuring their teeth and gums and the cable will often abrade or cut through the skin of the restrained animal. Thus while it is impossible for the animal or the like to escape, the animal can still damage its teeth or other parts of its body through contact with the restraining device and twist around in such a manner as to choke itself.

It is therefore an object of this invention to provide an improved and novel animal capturing and restraining device that affords increased physical protection to the animal being captured and restrained.

It is another object of this invention to provide an improved and novel animal capturing and restraining device in which the restraining loop may be rapidly and safely increased in size.

It is another object of this invention to provide an improved and novel animal capturing and restraining device wherein the length of the longitudinal handle may be selectively increased while not affecting the size of the restraining loop.

It is another object of this invention to provide an improved and novel animal capturing and restraining device wherein the animal restrained cannot twist the restraining cable around the longitudinal handle.

It is still another object of this invention to provide an improved and novel animal capturing and restraining device that restricts the carrying of fur, hair and the like by the cable into the internal mechanism of the longitudinal handle.

This invention concerns an elongated tubular body member with a flexible loop of plastic coated cable extending from one end of the body with the one end secured to the restraining end of the tubular body member. The other or free end of the cable passes through the tubular body member and extends freely from the open other end of the body member. A locking mechanism at the other end of the tubular body member selectively grasps the free end of the flexible cable and restrains it from moving through the tubular body member toward the restraining end and enlarging the size of the loop. The locking member however permits free movement of the flexible cable through the body member toward the other end thus reducing the size of the loop.

The novel and improved animal capturing and restraining member of this invention also has a resilient means such as a spring or the like that attaches to the cable adjacent the one end for quickly and automatically moving the cable outward through the open restraining end of the tubular member, thereby facilitating selective and automatic increase in the size of the loop. Further, the tubular body member comprises tubular members that telescope one over the other. Their composite length may be selectively held or adjusted by adjusting a friction operating clasp. This may be accomplished without reducing the size of the existing cable loop. The flexible cable loop is coated with a plastic or other suitable material covering that protects the animal restrained from cable abrasions, thereby reducing injuries to the animal. A ductile plastic sleeve is also positioned around the restraining end of the tubular member to be bitten by a captured animal or the like in a manner that will not injure the animal's teeth, gums or lips. Also the restrained end of the flexible cable is held in a recess ringing the one end of the tubular member in a manner that the cable may freely slide around the complete circumference of the tubular member thus allowing the animal and the cable loop to rotate around the restraining device without twisting the cable too tightly around the animal's neck.

Other objects and advantages of the invention will be apparent in the following specification and drawing in which like reference numerals identify like parts of the various figures thereof and wherein, FIGURE 1 is a side view of the animal capturing and restraining device with portions broken away to more clearly illustrate the construction, FIGURE 2 is a cross sectional view of a mid-portion of the invention illustrating the telescopic connection.

FIGURE 3 is a cross sectional view of the lower end of the capturing and restraining device.

FIGURE 4 is a view of the split ring used in my invention.

Figure 5:
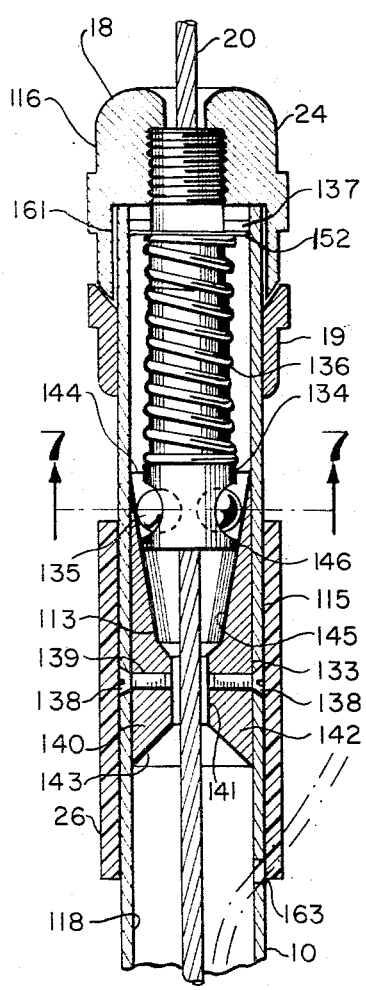
FIGURE 5 is an enlarged cross-section of the upper end of the restraining device illustrating the improved means for continuously and positively locking the loop forming member.

Referring now to the drawing that illustrates a preferred form of the invention, the animal capturing and restraining device has an elongated tubular body member formed of two telescoping parts, tubular members 10 and 12.

A flexible cable 14 is secured tat its lower end 58 by integrally connected ball 64 resting in circumferential groove 40 of the tubular body member 12. The free end of the cable member 14 then passes through the two tubular members 10 and 12 after forming a loop or bite 58 projecting out the restraining end of the tubular member 12. Rubber, plastic or the like hand grips 26 and 28 function to increase the users ability to maneuver the restraining device and place the cable loop over the neck or other portion of the animal. The free end of the cable 20 may be pulled through the tubular members 10 and 12 to decrease the size of the loop 58 in the obvious manner with the cable being locked in the particular position by locking device 18.

The locking assembly 115 is supported completely within the tubular upper portion 10 adjacent the upper end of the body member 12 and comprises essentially a camming member 133, a cage 134, a series of balls or bearings 135, a compression spring 136, and a retainer spring 137.

Referring particularly to FIGURE 5, the camming member 113 is generally cylindrical, fitting within the inner surface spaced below the open upper end of the latter and secured thereto by means of a pair of screws 138 passing through the wall thereof into suitably tapped holes 139. An intermediate portion 140 of the camming member 133 is provided with a hole or bore 141 loosely accommodating the cable 20 joined to the lower end 142 thereof by means of an outwardly tapering surface 143. The upper end 144 of the camming member 133 is defined by a tapered internal wall 145 of circular cross-section converging into the bore 141. The conical wall formed by the tapered surface 143 serves to guide the free end of the cable 20 into the bore 141 when assembling it through the guide piece.

The cage 134 is of generally cylindrical and elongated form having an outer surface 146 of somewhat smaller diameter than that of the camming member 133, and an internal bore 147 adapted to accommodate the cable 20. The lower end 148 is provided with a counterbore 149 and a series of equally spaced radial openings 150 having a maximum diameter equal to that of the balls 135, three being shown. Each of the openings 150 is adapted to accommodate one of the balls 135, but are smaller at their inner surfaces in the counterbore 149 than the maximum diameter of the balls 135, so that while the latter may be moved freely in an outwards direction, they cannot pass through the openings inwardly.

In assembly, the lower end 148 of the cage 134 having the balls 135 disposed in the openings 150 is adapted to fit within the upper end 144 of the camming member 133 in such a manner that the outer surfaces of the balls 135 engage the tapered material wall 145 of the latter, forcing the balls 135 inwardly when the cage 134 is disposed towards the lower end of the body member, and permitting them to move outwardly when the cage 134 is moved upwardly towards the upper end 24. The balls 135 are of such diameter that when they are disposed within the tapered internal wall 145 of the camming member 133 their adjacent inner surfaces bear against the cable 20 when the latter is passed through the bores 141 and 147 of the camming member 133 and the cage 134 respectively, thus locking the latter against movement therein. When the cage 134 is moved upwardly the balls 135 are released from engagement with the camming member 133 freeing the cable 20 for movement.

The compression spring 136 is adapted for support around the cage 134 and its lower end bears against a shoulder 151 formed as an undercut of the outer surface 146 of the latter. A washer 152 is provided having an external diameter adapted to fit within the tubular portion 10 and a central hole accommodating the cage 134. The inner surface 118 of the tubular member 10 is provided with a recess 153 adjacent the open upper end 114 of the body member 10 adapted to support the retainer spring 137. On assembly, the washer 152 is disposed above the spring 136, and the cage assembly 134 is retained in position by the retainer 137. The action of the spring 136 between the washer 152 and the shoulder 151 biases the cage 134 towards the camming member 133 engaging the balls 135 against the tapered surface 145 and forcing them inwardly to grip and lock the cable 20 and thus serving as a continuous and positive lock against moving the latter towards the loop 58, while permitting free movement of the cable 20 in the direction of the free end.

The upper end 154 of the cage 134 is adapted to extend through and above the open upper end 114 of the body member 10 and is threaded to support a release handle 24. The latter is generally cylindrical and is provided with a counterbore 156 in one end having clearance with the outer surface of the tubular upper member 10 to cooperate with the outer surface. The upper and lower edges of the handle 24 are rounded to present a smooth exterior contour. A central bore 157 is adapted to engage the threaded upper end 154 of the cage 134 and a central axial hole 158 is provided through which the cable 20 is adapted to pass on assembly. A guard 19 is provided having an outer surface conforming in diameter to the outer surface of the release handle 24 and is adapted to be secured as by brazing to the outer surface of the tubular upper member 10 below the release handle 24, so that the curved lower edge of the latter lies within a recess formed by an inwardly inclined edge 159 when the release handle 24 and locking assembly 115 are in their operative positions. The lower edge of the guard 19 is formed by an outwardly inclined surface 160 to provide a faired contour with the surface 10.

Figure 6:
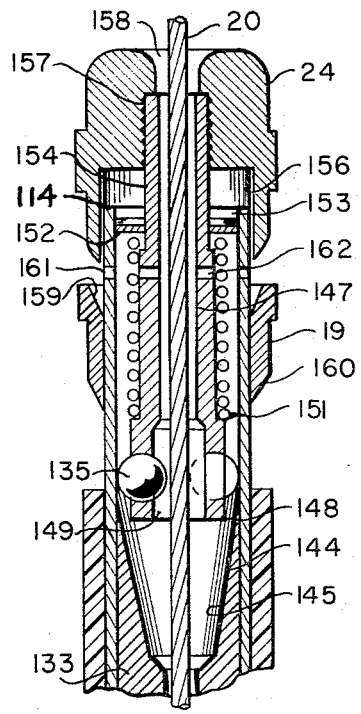
FIGURE 6 is a similar cross-section illustrating the action for releasing the locking means.
Figure 7:
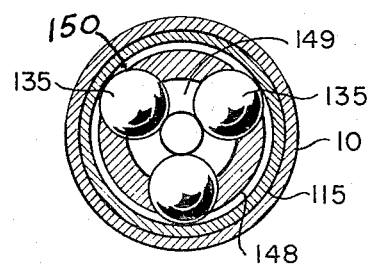
FIGURE 7 is a section on line VII—VII of FIGURE 5.

It will be seen from FIGURE 6, that when the release handle 24 is raised by holding the body member 10 with one hand and pulling the release handle 24 with the other, the cage 134 is moved so that the balls 135 do not engage the camming member 133, thus releasing the cable 20 in order that an object restrained in the loop 58 is released. The guard 19 prevents inadvertent release of the device caused by the body member A slipping through the hands of the operator.

To facilitate assembly and disassembly of the locking assembly 115, a pair of diametrically opposed openings 161 are provided in the upper end of the tubular member 10 which correspond and align with a radial opening 162 in the cage 134 when the release handle 155 is in its releasing position. A wire, nail, or awl may be inserted through the openings 161 and 162 to lock the tubular member 10 and the cage 134 against relative rotation so that the release handle 24 may be tightened or loosened.

It thus may be seen that while the present invention embodies a positive and continuous locking means, it is substantially confined within the contours of the body member A and presents no external irregularities that might cause inadvertent operation or disassembly of the device.

The tubular body members may have any desired length. However, the device to be safely used will have to have an operational length that is greater than that length that a user can handle during climbing in mountains, in trees, or the like. Accordingly tubular member 12 telescopes within tubular member 10 and the respective members are held in this secured position by a sleeve 30 that threads on the end of tubular member 10. A split ring 32 is drawn into contact with the curved internal surface 36 of sleeve member 30. This causes the sleeve member 30 to concentrically squeeze against the outer surface of the end of tubular member 12 holding tubular member 12 in a fixed telescopic position relative to tubular member 10.

Referring now to FIGURE 3, the loop 58 of the cable 14 that contacts the animal has a flexible sheath on the outside that may be made of a plastic such as Teflon, fiber glass or the like. The cable may be constructed of woven or twisted steel threads in the normal manner. The tip of the end portion 16 has a head portion 38 mounted thereon. This head portion 38 has internal threads that coact with the external threads on tubular member 12 holding the two members together. A set screw 50 locks the two members together and a ring recess 40 in the side of head 38 receives a ball 64 that is fixed to the end of the cable 14. A sleeve member 42 is held in spaced relationship to ring groove 40 and is held in this position by split ring 46 that fits into ring key slot 44. As may be seen, sleeve member 42 closes a sufficient portion of the ring groove 40 to hold ball member 64 within the groove. However ball member 64 and the end of the cable 58 is able to freely rotate around the entire circumference of the end 16 of the animal capturing and restraining device.

The free end of cable 14 is threaded through a sleeve 56 that is secured by welding, brazing or the like to the internal surface 57 of head 38. A spring 54 is fixed to the end of sleeve member 56 and encircles the cable member 14 and its outer plastic sheath 22 to the point of contacting position locking washer or member 60. Washer 60 is drawn against the end of the plastic coating on the cable 14 by spring 54. A sleeve member 61 between washer 60 and stop 62 prevents movement of the washer 60 beyond the point of stop 62. Thus spring 54 when tensioned draws, pulls or pushes cable 14 through opening 41 of the end 16 to enlarge the loop or bite of the end of the flexible member 14.

A plastic teeth guard 52 coats the outer surface of the restraining end of the tubular member 12 adjacent end 16. This plastic material 52 may be made from ductal plastic that allows the animal to bite the end of the animal capturing and restraining device without doing damage to either the device or the animal's teeth, gums or the like.

*Operation*

In operation, the animal capturing and restraining device should have a loop or bite 58 in the end of the cable 22 that is sufficient in size to encircle the neck or any other part of the animal that the user wants to capture or restrain. Generally with this length of loop, spring 54 has completely retracted so that no force is exerted by washer 60 against the longitudinal length of the cable 14. Cable 14 is in a static position with the desired size loop and end 58 that may freely slide in channel 40 around the end 16 of the tubular member. Thus the cable loop 58 is easily maneuvered to pass over the appropriate portions of the animal's body.

After the loop has been passed over or around say for example the neck of an animal, then the free end 58 of cable 14 is pulled by hand through tubular members 10 and 12 thereby decreasing the size of the loop 58 to the point where the loop is tightly grasping the animal. The portions of cable 16 pulled through the open end of tubular member 10 is held by the locking device 18 as described in my previous Patent Number 2,704,502. Also during this pulling of the free end of the cable 14, washer 60 has been moved away from sleeve 56 thus stretching spring 54.

Should the composite length of telescoped members 10 and 12 not be sufficient to hold the restrained animal a safe distance away from the user, then prior to capturing or grasping the animal, sleeve 30 is loosened thus releasing the split ring 32 from its compression grip against the outer surface of the tubular member 12. Tubular member 12 is then adjusted telescopically within the tubular member 10 and sleeve member 30 is again tightened against the threads on the end of the tubular member 10 again squeezing the split ring 32 into a grasping grip on the outer surface of the tubular member 12. The length of the restraining device is now long enough so that the animal may be moved to a point such as in a cage or the like where it is desired to release the animal. The locking member 18 is then pulled in a direction away from the end of the tubular member 10. This releases the cable 20 which is then ejected through the open end of the tubular member by spring 54 and washer 60 pushing and pressing against the outer plastic coating 22. This releases the grip of the cable on the animal and the animal is able to safely escape from the restraining device.

While the animal is held in the restraining device the plastic coating 58 on the cable 14 protects the animal from cutting by the metal fibers in the cable, or abrasions therefrom. Also after the loop has been placed around the animal's neck, leg, snout or the like, the cable 14 is then pulled through sleeve 56 with the length of sleeve 56 providing a sufficient space for restricting the passage on the cable of animal hair, fur or the like into the tubular member 12 and eventually clogging the operation of the spring 54.

In moving the animal, the tubular member can, of course, be rotated with the end ball 64 rotating in the ring groove 40 in a manner that the cable 15 is not twisted around the animal's neck.

It should be recognized that it is desirable to construct the tubular member and other portions of this invention out of light but strong and rigid materials. Accordingly the tubular member of this invention and the cable may be constructed of metals, laminated plastics, new type of plastic fibers or the like.

Having thus described my invention, that which I claim to be novel and desire to secure by Letters Patent is:

1. An animal capturing and restraining device having an elongated tubular member with one end of a flexible loop forming member being secured adjacent the restraining end of said tubular member and with the other end of said loop forming member being adapted to pass through and extend from said tubular member, the improvement comprising,
   said restraining end of said tubular member having a circumferential groove slidably retaining said one end of said loop forming member for sliding movement in said groove around said tubular member.

2. An animal capturing and restraining device having an elongated tubular member with one end of a flexible loop forming member being secured adjacent the restraining end of said tubular member and with the other end of said loop forming member being adapted to pass through and extend from said tubular member, the improvement comprising,
   said one end of said loop forming member having a ball on the end thereof,
   and said restraining end of said tubular member having a circumferential groove retaining said ball in circumferential sliding relationship to said tubular member.

3. An animal capturing and restraining device having an elongated tubular member with one end of a flexible loop forming member being secured adjacent the restraining end of said tubular member and with the other end of said loop forming member being adapted to pass through and extend from said tubular member, the improvement comprising,
   said restraining end of said tubular member having a tip portion with a longitudinal extension means projecting from said end into the volume of said tubular member and encircling said loop forming member for preventing passage of hair into said tubular member with said loop forming member,
   and said tip portion having a circumferential groove slidably retaining said one end of said loop forming member for sliding movement in said groove around said tubular member.

4. An animal capturing and restraining device having a rigid elongated tubular member with one end of a flexible loop forming member being secured adjacent the restraining end of said tubular member and with the other end of said loop forming member being adapted to pass through and extend from said tubular member, the improvement comprising,
   said restraining end of said tubular member having a tip portion with longitudinal extension means projecting from said end into the volume of said tubular member and encircling said loop forming member for preventing passage of hair into said tubular member with said loop forming member,
   said tip portion having a circumferential groove slidably retaining said one end of said loop forming member for sliding movement in said groove around said tubular member,
   and the outer surface of said tubular member adjacent said tip portion being enclosed with sleeve means of ductile material for providing a biting surface for the captured and restrained animal.

5. An animal capturing and restraining device having an elongated tubular body member with one end of a flexible loop forming member being secured adjacent the restraining end of said body member and with the other end of said loop forming member being adapted to pass through and extend from said tubular body member and with locking means for selectively preventing movement of said flexible member through said body member toward said restraining end while allowing said flexible member to move freely in the other direction, the improvement comprising, resilient means secured to said body member for selectively forcing a given portion of said flexible member out of said restraining end upon release of said locking means, and said restraining end of said tubular member having a circumferential groove slidably retaining said one end of said loop forming member for sliding movement in said groove around said tubular member.

6. An animal capturing and restraining device having an elongated tubular body member with one end of a flexible loop forming member being secured adjacent the restraining end of said body member and with the other end of said loop forming member being adapted to pass through and extend from said tubular member and with locking means for selectively preventing movement of said flexible member through said body member toward said restraining end while allowing said flexible member to move freely in the other direction, the improvement comprising, resilient means secured between said tubular member and said loop forming member for selectively forcing a given portion of said flexible member out of said restraining end upon release of said locking means, said body member comprising at least two telescoping members, said one end of said loop forming member having a ball on the end thereof, and said restraining end of said tubular member having a circumferential groove retaining said ball in circumferential sliding relationship to said tubular member.

7. An animal capturing and restraining device having an elongated tubular body member with one end of a flexible loop forming member being secured adjacent the restraining end of said body member and with the other end of said loop forming member being adapted to pass through and extend from said tubular body member and with locking means for selectively preventing movement of said flexible member through said body member toward said restraining end while allowing said flexible member to move freely in the other direction, the improvement comprising, resilient means secured between said tubular member and said loop forming member for selectively forcing a given portion of said flexible member out of said restraining end upon release of said locking means, said tubular member comprising at least two telescoping members, said restraining end of said tubular member having a tip portion with longitudinal extension means projecting into said end of said tubular member and encircling said loop forming member for preventing passage of hair into said tubular member with said loop forming member, said one end of said loop forming member having a ball on the end thereof, said tip portion having an outer circumferential groove for retaining said ball in circumferential sliding relationship to said tubular member, the outer surface of said tubular member adjacent said tip portion being enclosed with sleeve means of ductile material for providing a biting surface for the captured and restrained animal, said flexible loop forming member comprising a cable having a plastic coating, and said flexible loop forming member being freely rotatable around the longitudinal axis of said tubular member.

References Cited by the Examiner

UNITED STATES PATENTS

| | | | |
|---|---|---|---|
| 1,257,634 | 2/1918 | Perrin | 119—153 |
| 1,382,520 | 6/1921 | Lundene | 119—153 |
| 2,499,511 | 3/1950 | Koger | 119—153 |
| 2,704,052 | 3/1955 | Wood | 119—153 |
| 2,798,458 | 7/1957 | Odermatt | 119—106 |

FOREIGN PATENTS 219,302   12/1958   Australia.

SAMUEL KOREN, *Primary Examiner.*

HUGH R. CHAMBLEE, *Examiner.*